United States Patent
Lau et al.

(10) Patent No.: US 12,129,413 B2
(45) Date of Patent: Oct. 29, 2024

(54) LUMINESCENT TAGGANT COMPOSITIONS, LUMINESCENT MATERIALS INCLUDING THE SAME, AND ARTICLES INCLUDING THE SAME

(71) Applicant: HONEYWELL INTERNATIONAL INC., Morris Plains, NJ (US)

(72) Inventors: Carsten Lau, Hannover (DE); William Ross Rapoport, Bridgewater, NJ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 1065 days.

(21) Appl. No.: 15/810,959

(22) Filed: Nov. 13, 2017

(65) Prior Publication Data

US 2018/0142150 A1    May 24, 2018

Related U.S. Application Data

(60) Provisional application No. 62/425,354, filed on Nov. 22, 2016.

(51) Int. Cl.
*C09K 11/02*    (2006.01)
*C01F 17/294*    (2020.01)
(Continued)

(52) U.S. Cl.
CPC .......... *C09K 11/025* (2013.01); *C01F 17/294* (2020.01); *C01F 17/30* (2020.01);
(Continued)

(58) Field of Classification Search
None
See application file for complete search history.

(56) References Cited

U.S. PATENT DOCUMENTS

| | | | |
|---|---|---|---|
| 6,402,986 B1 * | 6/2002 | Jones, II | C09D 11/50 250/459.1 |
| 7,919,018 B2 | 4/2011 | Williams et al. | |

(Continued)

FOREIGN PATENT DOCUMENTS

| | | |
|---|---|---|
| EP | 1793330 A2 | 6/2007 |
| EP | 2180032 A2 | 4/2010 |
| WO | 2007131195 A2 | 11/2007 |

OTHER PUBLICATIONS

International Searching Authority, International Search Report for International Patent Application No. PCT/US2017/061521 mailed Feb. 19, 2018.

(Continued)

*Primary Examiner* — Edwin C Gunberg
(74) *Attorney, Agent, or Firm* — Lorenz & Kopf, LLP

(57) ABSTRACT

Luminescent taggant compositions, luminescent materials that include luminescent taggants, and articles including luminescent taggants are provided herein. In an embodiment, a luminescent taggant composition includes a first luminescent taggant, a second luminescent taggant, and a third luminescent taggant. The first luminescent taggant includes a first emitting ion that produces a first emission in a first taggant emission band when exposed to excitation energy. The second luminescent taggant includes a second emitting ion that is different from the first emitting ion and that produces a second emission in a second taggant emission band that is different from the first taggant emission band when exposed to excitation energy. The first luminescent taggant is substantially free of the second emitting ion and the second luminescent taggant is substantially free of the first emitting ion. The third luminescent taggant includes the first emitting ion and the second emitting ion.

19 Claims, 1 Drawing Sheet

(51) Int. Cl.
*C01F 17/30* (2020.01)
*C01G 15/00* (2006.01)
*C09K 11/77* (2006.01)
*G01N 21/62* (2006.01)
*G07D 7/1205* (2016.01)

(52) U.S. Cl.
CPC .......... *C09K 11/7771* (2013.01); *G01N 21/62* (2013.01); *G07D 7/1205* (2017.05); *C01G 15/006* (2013.01); *C04B 2235/764* (2013.01)

(56) References Cited

U.S. PATENT DOCUMENTS

| | | |
|---|---|---|
| 7,941,279 B2 | 5/2011 | Hwang et al. |
| 8,328,102 B2 | 12/2012 | Rapoport et al. |
| 8,330,122 B2 | 12/2012 | Smith et al. |
| 8,403,223 B2 | 3/2013 | Lewis et al. |
| 8,742,369 B2 | 6/2014 | Rapoport et al. |
| 9,162,514 B1 | 10/2015 | Trexler et al. |
| 2005/0031838 A1 | 2/2005 | Lagunowich et al. |
| 2005/0178841 A1* | 8/2005 | Jones, II ................ C09D 11/50 235/468 |
| 2007/0119951 A1* | 5/2007 | Auslander ........ G06K 19/06046 235/491 |
| 2009/0033932 A1 | 2/2009 | Gibson |
| 2009/0141961 A1 | 6/2009 | Smith et al. |
| 2010/0050901 A1 | 3/2010 | Biris et al. |
| 2011/0146930 A1* | 6/2011 | Kane .................. C09K 11/7766 162/181.1 |
| 2011/0147450 A1 | 6/2011 | Rapoport et al. |
| 2013/0048874 A1* | 2/2013 | Rapoport ............. B42D 25/382 250/459.1 |
| 2015/0115177 A1 | 4/2015 | Rapoport et al. |

OTHER PUBLICATIONS

International Searching Authority, Written Opinion of the International Searching Authority for International Patent Application No. PCT/US2017/061521 mailed Feb. 19, 2018.

* cited by examiner

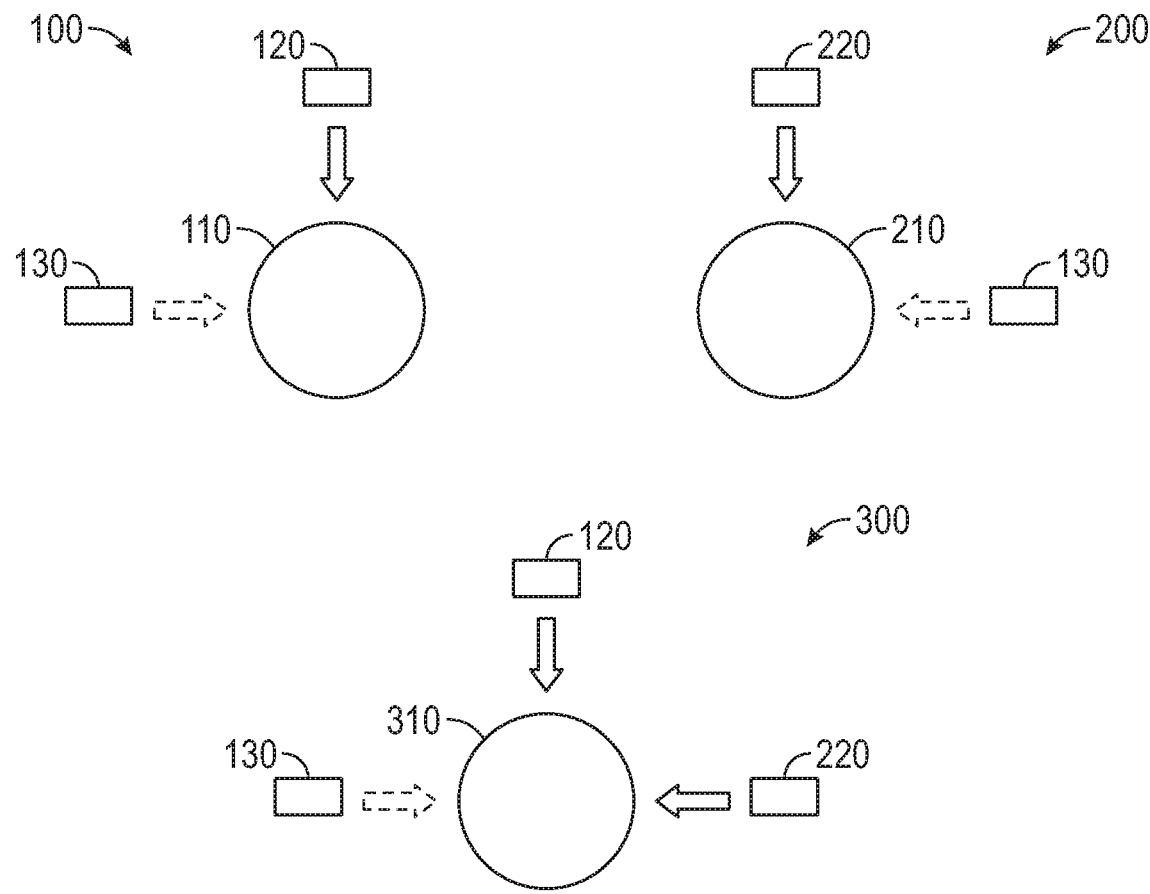
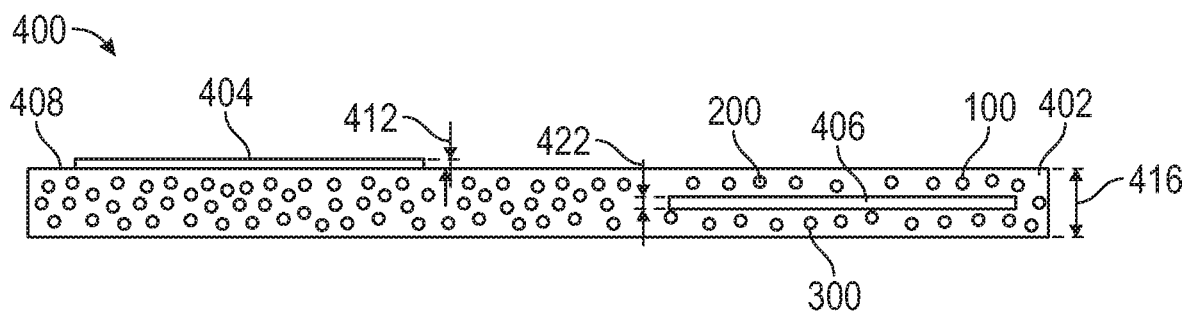
FIG. 2

LUMINESCENT TAGGANT COMPOSITIONS, LUMINESCENT MATERIALS INCLUDING THE SAME, AND ARTICLES INCLUDING THE SAME

PRIORITY CLAIMS

This application claims the benefit of U.S. Provisional Application No. 62/425,354, filed Nov. 22, 2016.

TECHNICAL FIELD

The technical field generally relates to luminescent taggant compositions including luminescent taggants, luminescent materials including the luminescent taggants, and articles including the luminescent taggants, where multiple luminescent taggants are employed to provide a unique spectral signature.

BACKGROUND

A luminescent taggant or luminescent phosphor compound is a compound that is capable of emitting detectable quantities of radiation in the infrared, visible, and/or ultraviolet spectrums upon excitation of the compound by an external energy source. A typical luminescent taggant includes at least a host crystal lattice, an emitting ion (e.g., rare earth ions that can either absorb/emit electromagnetic radiation or emit energy transferred thereto by another ion), and in some cases, a "sensitizing" ion (e.g., of a transition metal or a different rare earth metal that can absorb and transfer energy to the emitting rare earth metal ion). The production of radiation by a luminescent taggant is accomplished by absorption of incident radiation by the emitting ion(s) or by either or both the host material and the sensitizing ion(s), energy transfer from the host material/sensitizing ion(s) to the emitting ion(s), and radiation of the transferred energy by the emitting ion(s).

The selected components of a luminescent taggant may cause the compound to have particular emission properties, specific wavelengths for its excitation energy, and/or specific spectral position(s) for higher spectral energy output emitted by the emitting ions of the luminescent taggant ("emissions"). Not every ion will produce emissions in all host materials, however. There are many examples in which radiation that has the potential for emission is quenched, or the energy transfer from the sensitizing ions or the host material to the emitting ions is so poor that the radiation effects are barely observable. In other host materials, the radiation effects can be very large and with quantum efficiency near unity.

For a specific luminescent taggant that does produce observable emissions, the spectral position(s) of the higher spectral energy content (or luminescent output) in its emissions (i.e., its "spectral signature") may be used to uniquely identify the luminescent taggant from other compounds. Primarily, the spectral signature is due to the rare earth ion(s). However, spectral perturbations may be present due to the influence of the host material on the various emitting ions, typically through crystal field strength and splitting. This holds true for the temporal behavior of the emissions, as well.

The unique spectral properties of some luminescent taggants make them well suited for use in authenticating or identifying articles of particular value or importance (e.g., banknotes, passports, biological samples, and so on). Accordingly, luminescent taggants with known spectral signatures have been incorporated into various types of articles to enhance the ability to detect forgeries or counterfeit copies of such articles, or to identify and track the articles. For example, luminescent taggants have been incorporated into various types of articles in the form of additives, coatings, and printed or otherwise applied features that may be analyzed in the process of authenticating or tracking an article.

An article that includes a luminescent taggant may be authenticated using specially designed authentication equipment. More particularly, a manufacturer may incorporate a known luminescent taggant (e.g., an "authenticating" luminescent taggant) into its "authentic" articles. Authentication equipment configured to detect the authenticity of such articles would have knowledge (e.g., stored information and/or a variety of spectral filters) of the wavelengths of absorbable excitation energy and the spectral properties of emissions associated with the authenticating luminescent taggant. When provided with a sample article for authentication, the authentication equipment exposes the article to excitation energy having wavelengths that correspond with the known wavelengths of absorption features of the luminescent taggant that lead directly or indirectly to the desired emissions. The authentication equipment senses and characterizes the spectral parameters for any emissions that may be produced by the article. When the spectral signal of detected emissions is within the authenticating parameter range of the detection apparatus that corresponds with the authenticating luminescent taggant (referred to as the "detection parameter space"), the article may be considered authentic. Conversely, when the authentication equipment fails to sense signals expected within the detection parameter space, the article may be considered unauthentic (e.g., a forged or counterfeited article).

The above-described techniques are highly effective at detecting and thwarting relatively unsophisticated forgery and counterfeiting activities. However, individuals with the appropriate resources and equipment may be able to employ spectrometry techniques in order to determine the components of some luminescent taggants. The luminescent taggants may then be reproduced and used with unauthentic articles, thus compromising the authentication benefits that may otherwise be provided by a particular luminescent taggant.

Accordingly, although a number of luminescent taggants have been developed to facilitate article authentication in the above-described manner, it is desirable to develop additional compounds, unique ways of using such compounds with articles, and techniques for authenticating articles, which may render forgery and counterfeiting activities more difficult, and/or which may prove beneficial for identifying and tracking articles of particular interest. Furthermore, other desirable features and characteristics will become apparent from the subsequent detailed description and the appended claims, taken in conjunction with the accompanying drawings and this background.

BRIEF SUMMARY

Luminescent taggant compositions, luminescent materials that include luminescent taggants, and articles including the luminescent taggants are provided herein. In an embodiment, a luminescent taggant composition includes a first luminescent taggant, a second luminescent taggant, and a third luminescent taggant. The first luminescent taggant includes a first emitting ion, and the first luminescent taggant produces a first emission in a first taggant emission band when exposed to excitation energy. The second luminescent taggant includes a second emitting ion that is different from the first emitting ion, and the second luminescent taggant produces a second emission in a second taggant emission band that is different from the first taggant emission band when exposed to excitation energy. The first luminescent taggant is substantially free of the second emitting ion and the second luminescent taggant is substantially free of the first emitting ion. The third luminescent taggant includes the first emitting ion and the second emitting ion.

In another embodiment, a luminescent material includes a medium, a first luminescent taggant, a second luminescent taggant, and a third luminescent taggant. The first luminescent taggant is disposed in the medium and includes a first emitting ion. The first luminescent taggant produces a first emission in a first taggant emission band when exposed to excitation energy. The second luminescent taggant is disposed in the medium and includes a second emitting ion that is different from the first emitting ion. The second luminescent taggant produces a second emission in a second taggant emission band that is different from the first taggant emission band when exposed to excitation energy. The first luminescent taggant is substantially free of the second emitting ion and the second luminescent taggant is substantially free of the first emitting ion. The third luminescent taggant is disposed in the medium and includes the first emitting ion and the second emitting ion.

In another embodiment, an article includes a substrate and an authentication feature on a surface of the substrate or integrated within the substrate. The authentication feature includes a first luminescent taggant, a second luminescent taggant, and a third luminescent taggant. The first luminescent taggant includes a first emitting ion, and the first luminescent taggant produces a first emission in a first taggant emission band when exposed to excitation energy. The second luminescent taggant includes a second emitting ion that is different from the first emitting ion, and the second luminescent taggant produces a second emission in a second taggant emission band that is different from the first taggant emission band when exposed to excitation energy. The first luminescent taggant is substantially free of the second emitting ion and the second luminescent taggant is substantially free of the first emitting ion. The third luminescent taggant includes the first emitting ion and the second emitting ion.

BRIEF DESCRIPTION OF THE DRAWINGS

The various embodiments will hereinafter be described in conjunction with the following drawing figures, wherein like numerals denote like elements, and wherein:

FIG. 1 depicts potential components of a first luminescent taggant, a second luminescent taggant, and a third luminescent taggant, according to various example embodiments; and FIG. 2 is a cross-sectional side view of an article including a substrate and authentication feature in accordance with embodiments.

DETAILED DESCRIPTION

The following detailed description is merely exemplary in nature and is not intended to limit the luminescent taggant compositions, luminescent materials that include luminescent taggants, and articles including the luminescent taggants as set forth in the claims. Furthermore, there is no intention to be bound by any theory presented in the preceding background or the following detailed description.

Luminescent taggant compositions, as described herein, include a first luminescent taggant that includes a first emitting ion, a second luminescent taggant that includes a second emitting ion, and a third luminescent taggant that includes the first and second emitting ions. As used herein, the term "emitting ion" refers to an ion in the luminescent phosphor particles that emits energy, and that may also absorb energy itself and/or transfer energy to one or more other active ions. The first luminescent taggant produces a first emission in a first taggant emission band when exposed to excitation energy, and the second luminescent taggant produces a second emission in a second taggant emission band that is different, i.e., not indistinguishable, from the first taggant emission band when exposed to excitation energy. As used herein, an "emission band" is defined herein to mean a range of wavelengths of the electromagnetic spectrum within which concentrated, non-negligible (e.g., detectable) emissions occur from one or more emitting ions of the luminescent taggants. For any particular emitting ion, an "emission band" is bounded by a lower wavelength below which emissions are negligible for that ion, and an upper wavelength above which emissions are negligible for that ion from the same manifold or energy state (as set forth in Diecke diagrams). More specifically, the "emission band" goes from an upper energy level manifold to a lower energy level manifold, and all emissions within that band are part of the "emission band", as referred to herein, and are not to be considered emissions in separate emission bands, even if the actual emission exhibits gaps within the "emission band". It is to be appreciated that emitting ions may include more than one emission band. Notably, the first luminescent taggant is substantially free of the second emitting ion, and the second luminescent taggant is substantially free of the first emitting ion. By "substantially free of", it is meant that the respective luminescent taggants 100, 200 are not intentionally doped with the emitting ion at issue. With the third luminescent taggant including both the first and second emitting ions, the third luminescent taggant provides the luminescent taggant composition with a confounded emission in the first taggant emission band and a confounded emission in the second taggant emission band when exposed to excitation energy. As used herein, "excitation energy" refers to excitation energy having a range of wavelengths that corresponds to an absorption band of ions (either the emitting ions or sensitizing ions) or of the host material of the luminescent taggant. When appropriate excitation energy is directed toward a luminescent taggant, the excitation energy is absorbed and emitting ions (i.e., ions that may be the same or different from the ions that absorb the excitation energy) within the luminescent taggants may produce detectable emissions. "Confounded emissions," as referred to herein, are emissions from the luminescent taggant composition in the first taggant emission band and the second taggant emission band that are attributable to the respective emitting ions present alone in either the first luminescent taggant or the second luminescent taggant, but that cannot be reproduced with a physical mixture of the first luminescent taggant and the second luminescent taggant. The confounded emission from the luminescent taggant composition is produced by including the first emitting ion and the second emitting ion together in the third luminescent taggant, along with including the first luminescent taggant and the second luminescent taggant in the luminescent taggant composition. The third luminescent taggant can effectuate the confounded emission, e.g., by using a different host material in the third luminescent taggant, through selection of the first and second emitting ions such that energy transfer occurs therebetween when the emitting ions are present together in the host material, or through other mechanisms that modulate the emission from the respective emitting ions as compared to the emission produced by the first and second luminescent taggants. Alternatively, the third luminescent taggant can effectuate the confounded emission simply by contributing emissions in the first emission band and the second emission band, thereby making it impossible to attribute the emissions to any one luminescent taggant in the luminescent taggant composition. By producing the confounded emission with the third luminescent taggant, in addition to producing the first and second emissions with the first luminescent taggant and the second luminescent taggant, respectively, forgery and unauthorized attempts to reproduce the luminescent taggant compositions based upon interrogation of emissions from the luminescent taggant compositions are rendered more difficult if not impossible.

As alluded to above, the luminescent taggant composition includes a first luminescent taggant, a second luminescent taggant, and a third luminescent taggant. The luminescent taggant composition, as referred to herein, primarily includes the taggants but may further include additives, production residues, and the like that may be present with the luminescent taggants as packaged in a raw material. The luminescent taggant compositions may be included in luminescent materials that, in addition to the luminescent taggants, include a medium as described in further detail below.

FIG. 1 depicts potential components of the first luminescent taggant 100, the second luminescent taggant 200, and the third luminescent taggant 300, according to various example embodiments. The luminescent taggants 100, 200, 300 each include a host material 110, 210, 310, such as a host crystal lattice material. Each luminescent taggant 100, 200, 300 also includes emitting ion(s) 120, 220, as described in further detail below. In a further embodiment, the luminescent taggants 100, 200, 300 may optionally include a sensitizing ion 130 for absorption of incident radiation. When employed, the sensitizing ion 130 transfers energy to the first emitting ion 120 and/or the second emitting ion 220, respectively, after excitation, with little or no emissions generated by the sensitizing ion 130 itself. As described in further detail below, various combinations of emitting ions 120, 220 or host materials 110, 210, 310 may be employed between the first luminescent taggant 100, the second luminescent taggant 200, and the third luminescent taggant 300 to effectuate the desired confounded emission effect. Further, the same sensitizing ion 130, different sensitizing ions 130, or no sensitizing ion may be independently employed in the respective luminescent taggants 100, 200, 300.

The first luminescent taggant 100 includes a first host material 110, a first emitting ion 120 and, optionally, the sensitizing ion 130. The first luminescent taggant 100 produces a first emission in a first taggant emission band when exposed to excitation energy. In embodiments, the first taggant emission band corresponds to emissions from the first emitting ion 120 alone and without the influence of other active ions such as emitting ions and/or disturbing ions. As referred to herein, a "disturbing" ion is a material that modifies temporal decay properties, e.g., decay rate constant, of a luminescent taggant as compared to temporal decay properties in the absence of the disturbing ion. However, it is to be appreciated that in other embodiments, the first emission in the first taggant emission band may be influenced by other active ions, such as disturbing ions or sensitizing ions, provided that no other emitting ions other than the first emitting ion 120 are present in the first luminescent taggant 100. The first host material 110 includes a material into which the first emitting ion 120 and/or the sensitizing ion 130 are incorporated (i.e., substituted for one or more substitutable elements of the first host material 110). More particularly, the first host material 110 is a crystal lattice into which different chemical constituents may substitute at various positions within the lattice. Examples of suitable host materials include, but are not limited to, those chosen from an oxide, a fluoride, an oxysulfide, a halide, a borate, a silicate, a gallate, a phosphate, a vanadate, an oxyhalide, an aluminate, a molybdate, a tungstate, a garnet, a niobate, a perovskite, or mixtures thereof. In embodiments, the first host material 110 is chosen from an oxide, an oxysulfide, a borate, a gallate, a phosphate, an aluminate, a molybdate, a tungstate, a garnet, a perovskite, or mixtures thereof. Specific examples of suitable host materials include those independently chosen from yttrium oxysulfide, yttrium aluminum garnet, yttrium gallium garnet, gadolinium gallium garnet, gadolinium aluminum garnet, or gadolinium oxysulfide.

The first emitting ion 120 is, more specifically, an ion that is capable of emitting electromagnetic radiation when disposed in the first host material 110 and after excitation. In embodiments, the first emitting ion 120 is chosen from neodymium, ytterbium, erbium, thulium, or holmium. Depending upon specific emitting ions and host materials, less than 100 percent substitution is often necessary to impart effective luminescent properties to the luminescent taggant due to, e.g., emission quenching. However, it is to be appreciated that in some embodiments the first luminescent taggant 100 may be a stoichiometric taggant, meaning that the first emitting ion 120 may be 100 percent substituted into the host material 110 for another lattice ion (e.g., yttrium or other substitutable ion present in the host material 110 prior to substitution of the first emitting ion 120), with the first luminescent taggant 100 retaining effective luminescent properties after substitution. For example, stoichiometric taggants may be possible in embodiments in which the host material is a borate or phosphate. The amount of each ion (or atom) substituted into host material is described herein in terms of atomic percent.

As alluded to above, in embodiments, the first luminescent taggant 100 may further include a sensitizing ion 130, depending upon the mode of excitation desired for the first luminescent taggant 100. The sensitizing ion 130 may be, for example, a transition metal or a different rare earth metal other than the first emitting ion 120 that can absorb excitation energy from an external source and transfer the energy to the first emitting ion 120. Specific examples of suitable sensitizing ions include chromium and/or iron.

The second luminescent taggant 200 includes a second host material 210, a second emitting ion 220 and, optionally, the sensitizing ion 130. The second emitting ion 220 is different from the first emitting ion 120, and the second luminescent taggant 200 produces a second emission in a second taggant emission band that is different from the first taggant emission band when exposed to excitation energy. By "different from," it is meant that the second taggant emission band can be effectively distinguished from the first taggant emission band by conventional sensing equipment. In embodiments, the first and second taggant emission bands can be overlapping but with different peak emission wavelength. In other embodiments, the first and second taggant emission bands can be non-overlapping.

Other than the second emitting ion 220 being different from the first emitting ion 120, other aspects of the second luminescent taggant 200 may be the same as described above for the first luminescent taggant 100, including suitable host materials, emitting ions, sensitizing ions, etc. The first luminescent taggant 100 is substantially free of the second emitting ion 220 and the second luminescent taggant 200 is substantially free of the first emitting ion 120, meaning that the respective luminescent taggants 100, 200 are not intentionally doped with the emitting ion at issue. However, it is to be appreciated that impurity-level amounts of the unintended emitting ions may be present in the respective luminescent taggants 100, 200. In embodiments, the first luminescent taggant 100 and the second luminescent taggant 200 are both substantially free of additional emitting ions that have a detectable emission, thereby isolating emissions from the respective taggants to those attributable to the first emitting ion 120 and the second emitting ion 220, respectively. In other embodiments, additional emitting ions may be present in the first and/or second luminescent taggants 100, 200. In embodiments, no detectable energy transfer occurs between the emitting ions of the respective taggants and the additional emitting ions, when the additional emitting ions are present in the respective taggants.

In embodiments, substantially no energy is transferred between the first luminescent taggant 100 and the second luminescent taggant 200. More specifically, emissions from one of the emitting ions 120, 220 in either the first or second luminescent taggant 100, 200 is not detectably absorbed by emitting ions (and/or sensitizing ions, when present) of the other of the first or second luminescent taggant 100, 200 such that no detectable energy transfer occurs between the first and second luminescent taggants 100, 200. In this manner, absorption/emission dynamics between the first and second luminescent taggants 100, 200 are independent of each other, at least based upon detection limits for any energy transfer therebetween.

The third luminescent taggant 300 includes a third host material 310, the first emitting ion 120, the second emitting ion 220 and, optionally, the sensitizing ion 130. The third luminescent taggant 300 includes emitting ions 120, 200 from both the first luminescent taggant 100 and the second luminescent taggant 200 to produce emissions having common properties with each of the first luminescent taggant 100 and the second luminescent taggant 200, thus enabling the luminescent taggant composition to produce confounded emissions and rendering material identification and unauthorized reproduction difficult. In particular, the third luminescent taggant 300 produces an emission in the first taggant emission band and an emission in the second taggant emission band when exposed to excitation energy to result in a confounded emission from the luminescent taggant composition when the emissions from the first luminescent taggant 100, the second luminescent taggant 200, and the third luminescent taggant 300 are taken together. The emissions contributed by the third luminescent taggant 300 in the first emission band and the second emission band render it impossible to reproduce the overall emission spectra of the luminescent taggant composition with a physical mixture of the first luminescent taggant and the second luminescent taggant alone. In embodiments, the emissions from the third luminescent taggant 300 in the first taggant emission band and the second taggant emission band have one or more characteristics that are distinguishable from emission characteristics of the corresponding first emission and second emission of the first luminescent taggant 100 and the second luminescent taggant 200, respectively, to render material identification and unauthorized reproduction even more difficult. The particular characteristics of the emission from the third luminescent taggant 300 in the first taggant emission band and the second taggant emission band may be distinguishable from the corresponding characteristics of the first emission and the second emission in one or more of emission intensity, temporal characteristics, branching ratio, energy transfer to and emissions from another ion in another band, or a combination of such emission characteristics. In other embodiments, the third luminescent taggant 100 can effectuate the confounded emission by the luminescent taggant composition simply by contributing emissions in the first emission band and the second emission band, thereby making it impossible to attribute the emissions to any one luminescent taggant in the luminescent taggant composition As alluded to above, the confounded emission of the luminescent taggant composition in the first taggant emission band and the confounded emission of the luminescent taggant composition in the second taggant emission band are incapable of reproduction with the first luminescent taggant 100 and the second luminescent taggant 100, respectively, alone. In particular, the confounded emission in the first and second taggant emission bands cannot be reproduced with the first and second luminescent taggants 100, 200 themselves, regardless of emitting ion loading levels or inclusion of additional, non-emitting active ions such as sensitizing ions or disturbing ions. Such confounded emissions can be achieved, for example, by including the first emitting ion and the second emitting ion together in the third luminescent taggant, and may be further achieved by using different host materials that exhibit energy transfer with the particular emitting ions employed, or by using emitting ions that exhibit energy transfer therebetween, additional details of which are provided below.

In embodiments, the first luminescent taggant 100, the second luminescent taggant 100, and the third luminescent taggant 300 have a common excitation, i.e., the same excitation mode and/or excitation wavelength, such that a single source of exciting radiation may be employed to excite the first luminescent taggant 100, the second luminescent taggant 100, and the third luminescent taggant 300. The common excitation of the first luminescent taggant 100, the second luminescent taggant 100, and the third luminescent taggant 300 ensures that the combination of emissions from the first luminescent taggant, the second luminescent taggant, and the third luminescent taggant will be concurrently produced upon exposure to the common excitation.

In embodiments, substantially no energy is transferred between the first emitting ion 120 and the second emitting ion 220 in the third luminescent taggant 300. In particular, in this embodiment, emissions or energy from one of the first or second emitting ions 120, 220 is not absorbed or otherwise transferred to the other of the first or second emitting ions even when those emitting ions are present together in the third luminescent taggant 300. In this embodiment, the emissions of the third luminescent taggant 300 are produced by an effect other than by energy transfer between the first and second emitting ions 120, 220. For example, use of a different host material 310 for the third luminescent taggant 300 than the first or second luminescent taggant 100, 200 can result in production of the confounded emissions, e.g., due to energy transfer between the host material 310 and the emitting ions 120, 220. Host materials can have a substantial impact on emission characteristics of the luminescent taggants, with measurable differences between emissions from the same emitting ions in different host materials. In an embodiment, the third host material 310 is different from both the first host material 110 and the second host material 210. While the first host material 110 and the second host material 210 may be a common host material, it is also possible that different first and second host materials 110, 210 can be employed. In embodiments, the first host material 110 and the second host material 210 do not exhibit detectable energy transfer with the respective emitting ions 120, 220, while the third host material 310 does exhibit detectable energy transfer with the respective emitting ions 120, 220. Specific examples of luminescent taggant compositions in accordance with this embodiment include the first emitting ion 120 and the second emitting ion 220 independently chosen from neodymium, ytterbium, erbium, thulium, or holmium, and a different crystal host lattice included in each of the first, second, and third luminescent taggants, where the crystal host lattices are independently chosen from an oxide, a fluoride, an oxysulfide, a halide, a borate, a silicate, a gallate, a phosphate, a vanadate, an oxyhalide, an aluminate, a molybdate, a tungstate, a garnet, a niobate, a perovskite, or mixtures thereof. Other specific examples of luminescent taggant compositions in accordance with this embodiment include the first emitting ion 120 and the second emitting ion 220 independently chosen from neodymium, ytterbium, erbium, thulium, or holmium, the same host material 110, 210 included in each of the first and second luminescent taggants 100, 200, and a different host material 310 included in the third luminescent taggant 300, where the host materials are independently chosen from an oxide, a fluoride, an oxysulfide, a halide, a borate, a silicate, a gallate, a phosphate, a vanadate, an oxyhalide, an aluminate, a molybdate, a tungstate, a garnet, a niobate, a perovskite, or mixtures thereof.

In another embodiment, energy transfer occurs between the first emitting ion 120 and the second emitting ion 220 in the third luminescent taggant 300 after excitation. In this embodiment, substantially no energy is transferred between the first luminescent taggant 100 and the second luminescent taggant 200, i.e., energy transfer does not occur between the emitting ions 120, 220 when present in different taggants. The first host material 110, the second host material 210, and the third host material 310 may include a common, identical host material such that differences between host materials are not responsible for the confounded emissions. In embodiments, no detectable energy transfer occurs between the respective emitting ions 120, 220 in the first host material 110, the second host material 210, and the third host material 310. Because energy transfer between the first emitting ion 120 and the second emitting ion 220 in the third luminescent taggant 300 will impact one or more emission characteristics (e.g., emission intensity), emissions from the third luminescent taggant 300 will be different from the first emission from the first luminescent taggant 100 and the second emission from the second luminescent taggant 200, even when the same host material is employed between the first luminescent taggant 100, the second luminescent taggant 200, and the third luminescent taggant 300. Specific examples of luminescent taggant compositions in accordance with this embodiment include the first emitting ion 120 and the second emitting ion 220 independently chosen from neodymium, ytterbium, erbium, thulium, or holmium, and a common crystal host lattice employed in each of the first luminescent taggant 100, the second luminescent taggant 200, and the third luminescent taggant 300. In embodiments in accordance with these specific examples, the common crystal host lattice is chosen from:

an oxide, a fluoride, an oxysulfide, a halide, a borate, a silicate, a gallate, a phosphate, a vanadate, an oxyhalide, an aluminate, a molybdate, a tungstate, a garnet, a niobate, a perovskite, and mixtures thereof;

a fluoride, an oxysulfide, a halide, a borate, a silicate, a gallate, a phosphate, a vanadate, an oxyhalide, an aluminate, a molybdate, a tungstate, a garnet, a niobate, a perovskite, and mixtures thereof;

an oxide, a fluoride, a halide, a borate, a silicate, a gallate, a phosphate, a vanadate, an oxyhalide, an aluminate, a molybdate, a tungstate, a garnet, a niobate, a perovskite, and mixtures thereof;

an oxide, a fluoride, an oxysulfide, a borate, a silicate, a gallate, a phosphate, a vanadate, an oxyhalide, an aluminate, a molybdate, a tungstate, a garnet, a niobate, a perovskite, and mixtures thereof;

an oxide, a fluoride, an oxysulfide, a halide, a borate, a gallate, a phosphate, a vanadate, an oxyhalide, an aluminate, a molybdate, a tungstate, a garnet, a niobate, a perovskite, and mixtures thereof;

an oxide, a fluoride, an oxysulfide, a halide, a borate, a silicate, a gallate, a vanadate, an oxyhalide, an aluminate, a molybdate, a tungstate, a garnet, a niobate, a perovskite, and mixtures thereof;

an oxide, a fluoride, an oxysulfide, a halide, a borate, a silicate, a gallate, a phosphate, a vanadate, an aluminate, a molybdate, a tungstate, a garnet, a niobate, a perovskite, and mixtures thereof;

an oxide, a fluoride, an oxysulfide, a halide, a borate, a silicate, a gallate, a phosphate, a vanadate, an oxyhalide, a molybdate, a tungstate, a garnet, a niobate, a perovskite, and mixtures thereof;

an oxide, a fluoride, an oxysulfide, a halide, a borate, a silicate, a gallate, a phosphate, a vanadate, an oxyhalide, an aluminate, a molybdate, a tungstate, a niobate, a perovskite, and mixtures thereof;

an oxide, a fluoride, an oxysulfide, a halide, a borate, a silicate, a gallate, a phosphate, a vanadate, an oxyhalide, an aluminate, a molybdate, a tungstate, a garnet, a niobate, a perovskite, and mixtures thereof;

an oxide, a fluoride, an oxysulfide, a halide, a borate, a silicate, a gallate, a phosphate, a vanadate, an oxyhalide, an aluminate, a molybdate, a tungstate, a garnet, a niobate, a perovskite, and mixtures thereof; and an oxide, a fluoride, an oxysulfide, a halide, a borate, a silicate, a gallate, a phosphate, a vanadate, an oxyhalide, an aluminate, a molybdate, a tungstate, a garnet, a niobate, and mixtures thereof.

The luminescent taggant compositions as described herein may be employed in a luminescent material that includes, in addition to the luminescent taggants 100, 200, 300, a medium. The medium may be chosen from the group of an ink, an ink additive, a glue, a liquid, a gel, a polymer, a slurry, a plastic, plastic base resin, a glass, a ceramic, a metal, a textile, wood, fiber, paper pulp, and paper. For example, but not by way of limitation, the medium may correspond to material employed to form a substrate of an article, or the medium may correspond to a material that may be applied to (e.g., printed on, coated on, sprayed on, or otherwise adhered to or bonded to) the surface of an article substrate, or the medium may correspond to material employed to form a feature that is embedded within a substrate (e.g., an embedded feature, a security thread, and so on). In the former case, the luminescent taggants may be incorporated into a substrate material, for example, by combining the luminescent taggant composition with the medium and then forming the substrate with the medium, and/or by impregnating the medium with a colloidal dispersion of particles of the luminescent taggants. Impregnation may be performed, for example, by a printing, dripping, coating or spraying process.

FIG. 2 depicts a cross-sectional view of an article 400 that includes the first luminescent taggant 100, second luminescent taggant 200, and third luminescent taggant 300, according to an example embodiment. In particular, the article 400 includes a substrate 402 and an authentication feature 404, 406 on a surface 408 of the substrate 402 or integrated within the substrate 402, with the authentication feature 404, 406 including the luminescent taggants 100, 200, 300. For example, this may be accomplished by incorporating the luminescent material, which includes the medium and luminescent taggants 100, 200, 300, in or on the article 400. Alternatively, the luminescent material may actually be employed as the base material for the substrate 402. Conversely, in embodiments in which the luminescent material is applicable to the surface 408 of the substrate 402, the luminescent material may be printed onto one or more surfaces 408 of the substrate 402 in pre-determined locations. Conversely, when the luminescent material corresponds to an embedded authentication feature 406, the embedded authentication feature 406 is integrated with the substrate material when the substrate material is in a malleable form (e.g., when the material is a slurry, molten, or non-cured form). In any one of the above-described manners, the luminescent material or luminescent taggant compositions described herein may be incorporated into an article 400.

As alluded to above, the luminescent material may be incorporated in or on the article 400. In particular, in this embodiment, the article 400 may include surface-applied and/or embedded authentication features 404, 406 that include the luminescent taggants 100, 200, 300, and/or the article 400 may include particles of the luminescent taggants 100, 200, 300 that are evenly or unevenly dispersed within one or more components of the article 400 (e.g., within substrate 402 and/or one or more layers or other components of the article 400). The various relative dimensions of the authentication features 404, 406 and particles of the luminescent taggants 100, 200, 300 may not be to scale in FIG. 2. Although article 400 is illustrated to include both surface-applied and/or embedded authentication features 404, 406 and particles of the luminescent taggants 100, 200, 300, another article may include one or a combination of embedded authentication features 406, surface-applied authentication features 404, and dispersed particles of the luminescent taggants 100, 200, 300. Finally, although only one surface-applied authentication feature 404 and one embedded authentication feature 406 are shown in FIG. 2, an article may include more than one of either type of authentication feature 404, 406.

In various embodiments, article 400 may be any type of article selected from a group that includes, but is not limited to, identification card, a driver's license, a passport, identity papers, a banknote, a check, a document, a paper, a stock certificate, a packaging component, a credit card, a bank card, a label, a seal, a token, a postage stamp, an animal, and a biological sample.

Substrate 402, which may be rigid or flexible, may be formed from one or more layers or components, in various embodiments. The variety of configurations of substrate 402 are too numerous to mention, as the luminescent taggants 100, 200, 300 of the various embodiments may be used in conjunction with a vast array of different types of articles. Therefore, although a simple, unitary substrate 402 is illustrated in FIG. 2, it is to be understood that substrate 402 may have any of a variety of different configurations. For example, a substrate 402 may be a "composite" substrate that includes a plurality of layers or sections of the same or different materials. For example, but not by way of limitation, a substrate 402 may include one or more paper layers or sections and one or more plastic layers or sections that are laminated or otherwise coupled together to form the composite substrate (e.g., a paper layer/plastic layer/paper layer or plastic layer/paper layer/plastic layer composite substrate). In addition, although inanimate, solid articles are discussed herein, it is to be understood that an "article" also may include a human, an animal, a biological specimen, a liquid sample, and virtually any other object or material into or onto which a luminescent material of an embodiment may be included.

Surface-applied authentication feature 404 may be, for example but not by way of limitation, a printed authentication feature or an authentication feature that includes one or more rigid or flexible materials into which or onto which luminescent taggants 100, 200, 300 as described herein are included. For example, but not by way of limitation, the surface-applied authentication feature 404 may include an ink, pigment, coating, or paint that includes particles of a luminescent taggants 100, 200, 300. Alternatively, the surface-applied authentication feature 404 may include one or more rigid or flexible materials into which or onto which particles of a luminescent taggants 100, 200, 300 are included, where the surface-applied authentication feature 404 is then adhered or otherwise attached to the surface 408 of the substrate 402. According to various embodiments, surface-applied authentication feature 404 may have a thickness 412 of about one micron or more, and surface-applied authentication feature 404 may have a width and length that is less than or equal to the width and length of the substrate 402.

Embedded authentication feature 406 may include one or more rigid or flexible materials in which or onto which luminescent taggants 100, 200, 300 as described herein are included. For example, but not by way of limitation, embedded authentication feature 406 may be configured in the form of a discrete, rigid or flexible substrate, a security thread, or another type of structure. According to various embodiments, embedded authentication feature 406 may have a thickness 422 in a range of about one micron up to the thickness 416 of the substrate 402, and embedded authentication feature 406 may have a width and length that is less than or equal to the width and length of the substrate 402.

As mentioned above, particles of the luminescent taggants 100, 200, 300 may be evenly or unevenly dispersed within substrate 402, as shown in FIG. 2, or within one or more other components of the article 400 (e.g., within one or more layers or other components of the article 400), in other embodiments. The particles of the luminescent taggants 100, 200, 300 may be dispersed within substrate 402 or another component, for example but not by way of limitation, by mixing particles of the luminescent taggants 100, 200, 300 into the medium that is employed to form the substrate 402 or other component, and/or by impregnating the substrate 402 or other component with a colloidal dispersion of the particles of the luminescent taggants 100, 200, 300, as discussed previously.

The absorption and emission properties of embodiments of luminescent taggants discussed herein (e.g., luminescent taggants 100, 200, 300 of FIG. 1) are consistent with their use in conjunction with security and authentication features. For example, using relatively conventional authentication equipment, embodiments of luminescent taggants 100, 200, 300 may be readily excited and the emissions detected through conventional techniques.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment. It being understood that various changes may be made in the function and arrangement of elements described in an exemplary embodiment without departing from the scope as set forth in the appended claims.

What is claimed is:

1. A luminescent taggant composition comprising:
   a first luminescent taggant comprising a first emitting ion, wherein the first luminescent taggant produces a first emission in a first taggant emission band when exposed to excitation energy;
   a second luminescent taggant comprising a second emitting ion different from the first emitting ion, wherein the second luminescent taggant produces a second emission in a second taggant emission band that is different from the first taggant emission band when exposed to excitation energy; and
   a third luminescent taggant comprising the first emitting ion and the second emitting ion;
   wherein the first luminescent taggant is substantially free of the second emitting ion and the second luminescent taggant is substantially free of the first emitting ion;
   wherein the first emitting ion and the second emitting ion are independently chosen from neodymium, ytterbium, erbium, thulium, or holmium; and
   wherein each luminescent taggant includes at least a host material, the respective emitting ion(s), and optionally a sensitizing ion, whereby production of radiation by the luminescent taggants is accomplished by absorption of incident radiation by the emitting ion(s) or by either or both the host material and the optional sensitizing ion(s), energy transfer from the host material/sensitizing ion(s) to the emitting ion(s), and radiation of the transferred energy by the emitting ion(s).

2. The luminescent taggant composition of claim 1, wherein the third luminescent taggant produces an emission in the first taggant emission band and an emission in the second taggant emission band when exposed to excitation energy, and wherein the emissions from the third luminescent taggant in the first taggant emission band and the second taggant emission band have one or more characteristics distinguishable from emission characteristics of the corresponding first emission and second emission, respectively.

3. The luminescent taggant composition of claim 1, having a confounded emission in the first taggant emission band and a confounded emission in the second taggant emission band that are incapable of reproduction with the first luminescent taggant and the second luminescent taggant, respectively, alone.

4. The luminescent taggant composition of claim 3, wherein the characteristics of the emission from the third luminescent taggant in the first taggant emission band and the second taggant emission band are distinguishable from the corresponding characteristics of the first emission and the second emission of the first luminescent taggant and the second luminescent taggant, respectively, in one or more of emission intensity, temporal characteristics, branching ratio, energy transfer to and emissions from another ion in another band, or a combination of such emission characteristics.

5. The luminescent taggant composition of claim 1, wherein the first luminescent taggant, the second luminescent taggant, and the third luminescent taggant have a common excitation.

6. The luminescent taggant composition of claim 1, wherein the first luminescent taggant, the second luminescent taggant, and/or the third luminescent taggant further comprises a sensitizing ion for absorption of incident radiation, wherein the sensitizing ion transfers energy to the first emitting ion and/or the second emitting ion, respectively, after excitation.

7. The luminescent taggant composition of claim 1, wherein substantially no energy is transferred between the first luminescent taggant and the second luminescent taggant.

8. The luminescent taggant composition of claim 1, wherein substantially no energy is transferred between the first emitting ion and the second emitting ion in the third luminescent taggant.

9. The luminescent taggant composition of claim 8, wherein the first luminescent taggant comprises a first host material, the second luminescent taggant comprises a second host material, and the third luminescent taggant comprises a third host material, and wherein the third host material is different from the first host material and the second host material.

10. The luminescent taggant composition of claim 1, wherein energy transfer occurs between the first emitting ion and the second emitting ion in the third luminescent taggant after excitation.

11. The luminescent taggant composition of claim 10, wherein the first luminescent taggant comprises a first host material and the second luminescent taggant comprises a second host material, and wherein the first host material and the second host material are a common host material.

12. The luminescent taggant composition of claim 11, wherein the third luminescent taggant comprises a third host material, and wherein the first host material, the second host material, and the third host material are a common host material.

13. The luminescent taggant composition of claim 12, wherein the host materials are chosen from an oxide, a fluoride, an oxysulfide, a halide, a borate, a silicate, a gallate, a phosphate, a vanadate, an oxyhalide, an aluminate, a molybdate, a tungstate, a garnet, a niobate, a perovskite, or mixtures thereof.

14. The luminescent taggant composition of claim 13, wherein the host materials are chosen from yttrium oxysulfide, yttrium aluminum garnet, yttrium gallium garnet, gadolinium gallium garnet, gadolinium aluminum garnet, or gadolinium oxysulfide.

15. The luminescent taggant composition of claim 1, wherein the first luminescent taggant and the second luminescent taggant are substantially free of additional emitting ions having a detectable emission.

16. A luminescent material comprising:
   a medium;
   a first luminescent taggant disposed in the medium and comprising a first emitting ion, wherein the first luminescent taggant produces a first emission in a first taggant emission band when exposed to excitation energy;
   a second luminescent taggant disposed in the medium and comprising a second emitting ion different from the first emitting ion, wherein the second luminescent taggant produces a second emission in a second taggant emission band that is different from the first taggant emission band when exposed to excitation energy; and a third luminescent taggant disposed in the medium and comprising the first emitting ion and the second emitting ion;

wherein the first luminescent taggant is substantially free of the second emitting ion and the second luminescent taggant is substantially free of the first emitting ion;

wherein the first emitting ion and the second emitting ion are independently chosen from neodymium, ytterbium, erbium, thulium, or holmium; and wherein each luminescent taggant includes at least a host material, the respective emitting ion(s), and optionally a sensitizing ion, whereby production of radiation by the luminescent taggants is accomplished by absorption of incident radiation by the emitting ion(s) or by either or both the host material and the optional sensitizing ion(s). energy transfer from the host material/sensitizing ion(s) to the emitting ion(s), and radiation of the transferred energy by the emitting ion(s).

17. The luminescent material of claim 16, wherein the medium is chosen from the group of an ink, an ink additive, a glue, a liquid, a gel, a polymer, a slurry, a plastic, plastic base resin, a glass, a ceramic, a metal, a textile, wood, fiber, paper pulp, and paper.

18. An article comprising:
a substrate; and
an authentication feature on a surface of the substrate or integrated within the substrate, wherein the authentication feature comprises:
a first luminescent taggant comprising a first emitting ion, wherein the first luminescent taggant produces a first emission in a first taggant emission band when exposed to excitation energy;
a second luminescent taggant comprising a second emitting ion different from the first emitting ion, wherein the second luminescent taggant produces a second emission in a second taggant emission band that is different from the first taggant emission band when exposed to excitation energy; and
a third luminescent taggant comprising the first emitting ion and the second emitting ion;
wherein the first luminescent taggant is substantially free of the second emitting ion and the second luminescent taggant is substantially free of the first emitting ion;
wherein the first emitting ion and the second emitting ion are independently chosen from neodymium, ytterbium, erbium, thulium, or holmium; and
wherein each luminescent taggant includes at least a host material, the respective emitting ion(s), and optionally a sensitizing ion, whereby production of radiation by the luminescent taggants is accomplished by absorption of incident radiation by the emitting ion(s) or by either or both the host material and the optional sensitizing ion(s), energy transfer from the host material/sensitizing ion(s) to the emitting ion(s), and radiation of the transferred energy by the emitting ion(s).

19. The article of claim 18, wherein the article is selected from a group consisting of an identification card, a driver's license, a passport, identity papers, a banknote, a check, a document, a paper, a stock certificate, a packaging component, a credit card, a bank card, a label, a seal, a token, a postage stamp, an animal, and a biological sample.

* * * * *